(No Model.)

M. HARRIS.
HOOF EXPANDER.

No. 419,667. Patented Jan. 21, 1890.

WITNESSES

INVENTOR
Milo Harris

UNITED STATES PATENT OFFICE.

MILO HARRIS, OF JAMESTOWN, NEW YORK.

HOOF-EXPANDER.

SPECIFICATION forming part of Letters Patent No. 419,667, dated January 21, 1890.

Application filed October 18, 1889. Serial No. 327,404. (No model.)

*To all whom it may concern:*

Be it known that I, MILO HARRIS, a citizen of the United States, residing at Jamestown, in the county of Chautauqua and State of New York, have invented certain new and useful Improvements in Hoof-Expanders; and I do hereby declare the following to be a full, clear, and exact description of the invention, such as will enable others skilled in the art to which it appertains to make and use the same.

The object of my invention is to provide a cheap, durable, and efficient hoof-expander, and one less liable to be lost than those heretofore used; and the improvement consists in securing the expander to the hoof of the horse by means of a metal plate which is securely attached to the toe of the expander and extends across the hoof, and may be nailed to the hoof each side, as shown in the accompanying drawings, in which—

Figure 1:
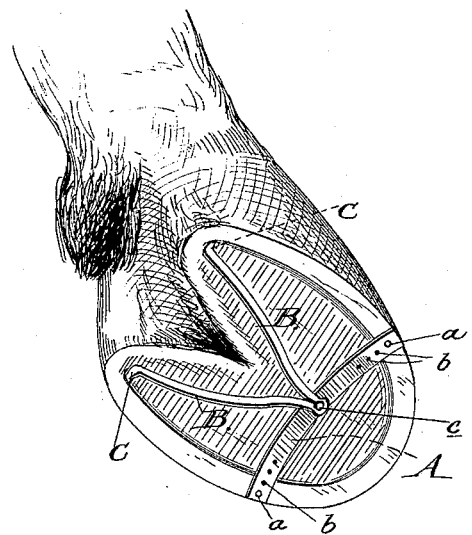
Figure 2:
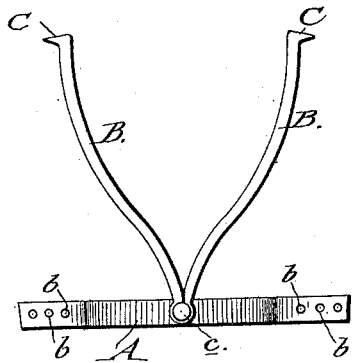

Figure 1 shows expander as attached, and Fig. 2 a plan view.

In the drawings, A represents a flat metal plate, preferably made of spring-steel, having a hole through its center and a series of holes $b$ $b$ at each end for the purpose of nailing the plate to the hoof, as shown at $a$ $a$, Fig. 1.

B B is a spring-steel rod or wire of suitable size and shape, bent substantially in the form shown, and has sharp projections or spurs C C for the purpose of securing the same to the heel of the hoof, as shown in Fig. 2, and these spring-arms B B are drawn together to insert the spurs in the heel of the hoof, and should have enough outward tension when so inserted to not only hold the spurs C C in place, but give a constant outward pressure to make the desired expansion of the hoof. The front end of said spring-expander is turned so as to form a loop, through which the rivet $c$ may pass in order to hold the same securely to the cross-plate A, as shown. The spring-arms B B could come together at their front end and have a hole for the rivet $c$; but this would not give as much elasticity to the arms as desired.

The object of having a series of holes at the ends of the plate A is to fit different-sized hoofs with the same expander and save making so many different sizes.

One particular object of having the flat plate A turn on the rivet $c$ is that the ends of the plate may be turned, so as never to interfere with the nails of the shoe. This flat plate is better to be concave, so as to hold the front of the expander close to the hoof.

In order to have the expander do efficient work, it is desirable to keep the hoof as soft as possible.

I use a flat-head nail for securing this cross-plate to the hoof, and the shoe goes over these arm ends without trouble, and if the shoe is lost the expander is still in place till desired to be removed, and can be used again. It may be used successfully without the shoe, and so expand the hoof more readily, which is a very desirable improvement.

The holes at the end of the cross-plate A may be put in by the smith when fitting the expander, and if the ends are too long they are readily cut off.

I claim—

The combination, with the spring-arms provided with spurs at their rear ends and a loop at their joined front ends, of the concave metal plate riveted to the loop of said arms, so as to lie transversely across the hoof, and with perforated ends by which it may be secured to the hoof, substantially as shown and described.

In testimony whereof I affix my signature in presence of two witnesses.

MILO HARRIS.

Witnesses:
A. R. WILLIAMS,
M. P. CALLAN.